United States Patent
Nguyen et al.

(10) Patent No.: US 11,170,025 B1
(45) Date of Patent: Nov. 9, 2021

(54) SYSTEMS AND METHODS FOR IMPROVING COMPUTATIONAL SPEED OF PLANNING BY CACHING OPTIMIZATION IN HYPERCUBES

(71) Applicant: Workday, Inc., Pleasanton, CA (US)

(72) Inventors: Ngoc Nguyen, Cupertino, CA (US); Darren Kermit Lee, Sunnyvale, CA (US); Shuyuan Chen, Palo Alto, CA (US); Ritu Jain, Fremont, CA (US); Francis Wang, Foster City, CA (US)

(73) Assignee: Workday, Inc., Pleasanton, CA (US)

( * ) Notice: Subject to any disclaimer, the term of this patent is extended or adjusted under 35 U.S.C. 154(b) by 145 days.

(21) Appl. No.: 16/397,128

(22) Filed: Apr. 29, 2019

Related U.S. Application Data (60) Provisional application No. 62/664,454, filed on Apr. 30, 2018.

(51) Int. Cl.
| | | |
|---|---|---|
| *G06F 16/28* | (2019.01) | |
| *G06F 7/76* | (2006.01) | |
| *G06F 12/0842* | (2016.01) | |
| *G06F 16/25* | (2019.01) | |

(52) U.S. Cl.
CPC .............. *G06F 16/283* (2019.01); *G06F 7/76* (2013.01); *G06F 12/0842* (2013.01); *G06F 16/254* (2019.01)

(58) Field of Classification Search
CPC .... G06F 16/254; G06F 16/285; G06F 16/283; G06F 12/0842; G06F 7/78
See application file for complete search history.

(56) References Cited

U.S. PATENT DOCUMENTS

| | | | | |
|---|---|---|---|---|
| 5,819,102 A | * | 10/1998 | Reed | G06F 9/3877 712/34 |
| 2010/0050230 A1 | * | 2/2010 | Aebig | G06F 16/93 726/1 |
| 2010/0169758 A1 | * | 7/2010 | Thomsen | G06F 40/18 715/212 |
| 2013/0159832 A1 | * | 6/2013 | Ingargiola | G06Q 40/00 715/220 |
| 2017/0124049 A1 | * | 5/2017 | Campbell | G06K 9/00 |

OTHER PUBLICATIONS

Hermans et al., "Detecting Code Smells in Spreadsheet Formulas", 2011, Software Engineering Research Group, Delft University of Technology. (Year: 2011).*

* cited by examiner

*Primary Examiner* — Apu M Mofiz
*Assistant Examiner* — Sheryl L Holland
(74) *Attorney, Agent, or Firm* — Van Pelt, Yi & James LLP (57) ABSTRACT

A system for caching includes an interface to receive a portion of a hypercube to evaluate. The hypercube includes cells with a set of the cells having a formula. The system includes a processor to determine term(s) in the formula for each cell of the set of cells; remove from consideration a time dimension and/or a primary dimension for the term(s) in the formula for each cell of the set of cells; determine a set of distinct terms using the term(s); determine whether a total number of terms in the set of cells is larger than a number of distinct terms in the set of distinct terms; and in response to determining that the total number of terms in the set of cells is larger than the number of distinct terms in the set of distinct terms, indicate to cache the set of distinct terms during evaluation.

22 Claims, 10 Drawing Sheets

SYSTEMS AND METHODS FOR IMPROVING COMPUTATIONAL SPEED OF PLANNING BY CACHING OPTIMIZATION IN HYPERCUBES

CROSS REFERENCE TO OTHER APPLICATIONS

This application claims priority to U.S. Provisional Patent Application No. 62/664,454 entitled SYSTEMS AND METHODS FOR IMPROVING COMPUTATIONAL SPEED OF PLANNING BY CACHING OPTIMIZATION IN HYPERCUBES filed Apr. 30, 2018 which is incorporated herein by reference for all purposes.

BACKGROUND OF THE INVENTION

Planning systems typically utilize a large multidimensional data space for representing complex systems or organizations. The data space can easily include billions of cells requiring calculations. Formulas for calculating cell values include references to other cell values, creating a complex network of references. Despite this high level of complexity, it is desirable for planning systems to be interactive tools that produce computation results very quickly, creating a problem when too many computations are required. Often, the time to perform all the computations required for the planning system is significant and too long for interactive use.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for caching comprises an interface configured to receive a portion of a hypercube to evaluate, wherein the portion of the hypercube comprises a plurality of cells, wherein a set of cells of the plurality of cells includes a formula, and a processor configured to determine one or more terms in the formula for each cell of the set of cells, remove from consideration a time dimension and/or a primary dimension for the one or more terms in the formula for each cell of the set of cells, determine a set of distinct terms using the one or more terms, determine whether a total number of terms in the set of cells is larger than a number of distinct terms in the set of distinct terms, and in response to determining that the total number of terms in the set of cells is larger than the number of distinct terms in the set of distinct terms, indicate to cache the set of distinct terms during evaluation of the portion of the hypercube.

A system for caching comprises a system for determining whether a performance increase to a planning system can be achieved by caching, and in the event it is determined that a performance increase can be achieved by caching, performing caching to realize the performance increase. Determining whether a performance increase can be achieved by caching comprises determining whether a set of operations is performed repeatedly—for example, so that the performance increase can be realized by storing the results of the set of operations rather than repeating the operations. Determining whether a set of operations is performed repeatedly comprises determining whether the number of distinct operations performed is less—ideally much less—than the total number of operations performed. Evaluation of the planning system comprises evaluating a set of formulas including one or more terms comprising lookups to other locations in the planning system. Determination of the value associated with the terms comprises the operation optimized by caching.

In a complex planning system, determining a total number of distinct terms to evaluate can be complex. To simplify the determination, an assumption is made that all evaluations will need to be performed across two dimensions of the planning system. The dimensions are the time dimension and a dimension specified as the primary dimension of the planning system. Evaluations in the other dimensions may be sparse (e.g., calculations are only performed using a fraction of the total possible values for the dimension). To determine the total number of distinct terms to evaluate, the set of terms is determined, the time dimension and/or primary dimension are removed from consideration for each term, and the number of distinct terms remaining is determined. The cardinality of distinct terms is multiplied by the cardinality of the primary dimension to determine the total number of distinct evaluations to perform (e.g., wherein each evaluation comprises an evaluation across the time dimension). The total number of distinct evaluations to perform is compared with the total number of terms in the set of terms, and in the event the total number of terms in the set of terms is larger than the total number of distinct evaluations to perform, it is determined that caching will increase performance. For example, in the event the total number of terms in the set of terms is greater than a threshold factor (e.g., 2 times, 5 times, 10 times, etc.) larger than the total number of distinct evaluations to perform, it is determined that caching will increase performance.

Other caching systems can also be used to increase performance of the planning system. Some terms comprise constant terms. For example, constant terms comprise terms for which the value can be directly determined from the literal term definition without regard for scoping (e.g., the number of inherited dimensional values associated with the cell based on the cell's location in the hypercube). Caching constant terms can result in a performance increase. Some terms comprise low permutation terms. For example, low permutation terms comprise terms wherein determination of a dimension value by scoping is required for evaluation of the term, however, the cardinality of the potential dimension value is less than the number of occurrences of the term (e.g., the number of potential values for the term is less than the number of times the term is to be calculated).

The system improves the computer by speeding computation through the use of strategic caching. This strategic caching, even though supporting the additional overhead of storing and indexing cached values, improves overall system performance by reducing the computation time of the system. The determination of whether to perform strategic caching removes the possibility that the caching overhead will negate any savings achieved by the caching.

Figure 1:
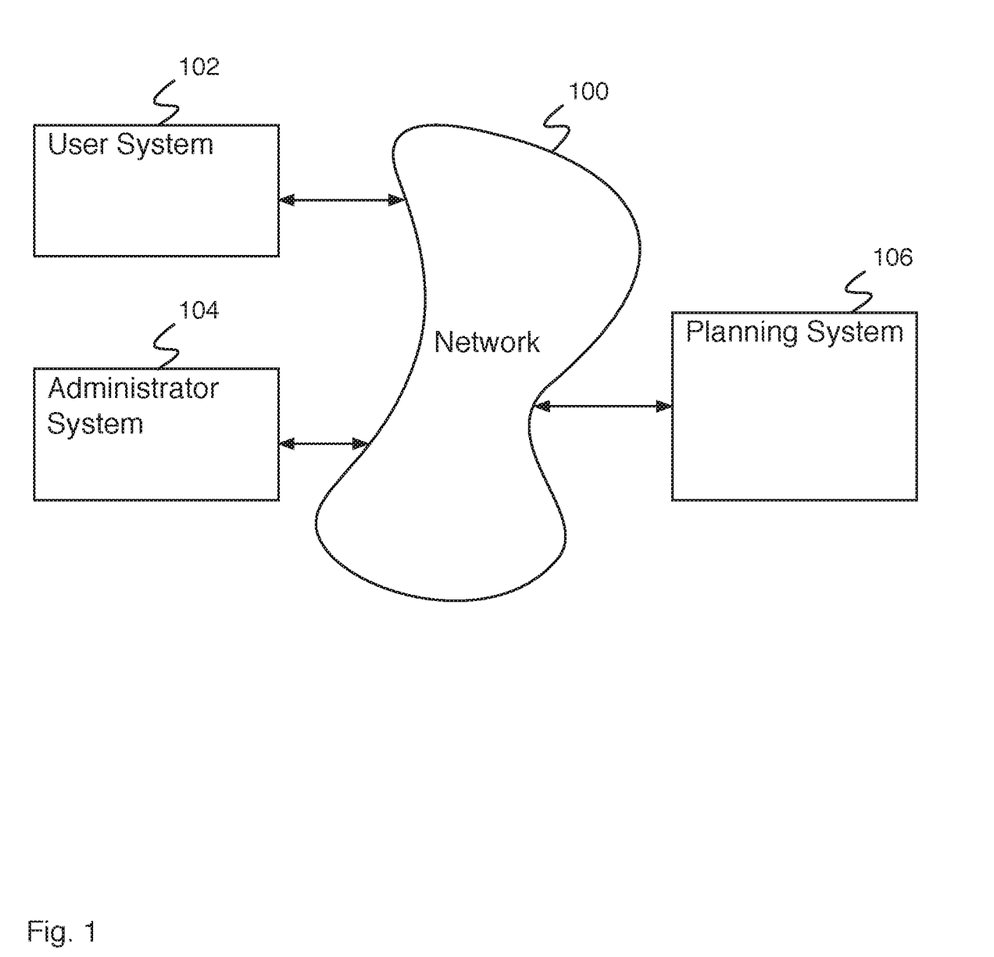
FIG. 1 is a block diagram illustrating an embodiment of a network system.

FIG. 1 is a block diagram illustrating an embodiment of a network system. In some embodiments, the network system of FIG. 1 comprises a network system for a planning system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and planning system 106 communicate via network 100.

User system 102 comprises a user system for use by a user. A user uses a user system to interact with planning system 106—for example, to store planning data, to request planning data, to request reporting based on planning data, to evaluate planning calculations, etc. In some embodiments, the network system of FIG. 1 comprises a plurality of user systems associated with one or more users. Administrator system 104 comprises an administrator system for use by an administrator. Administrator system 104 comprises an administrator system for executing administrator commands, for configuring planning system 106, etc.

Planning system 106 comprises a planning system for organizational planning. For example, planning system 106 comprises data and computations arranged in a grid form. Planning system 106 comprises a plurality of dimensions for data organization (e.g., planning system 106 comprises a hypercube). In some embodiments, evaluation of a hypercube or a portion of a hypercube of planning system 106 is sped up by caching. For example, planning system 106 comprises a system for caching, comprising an interface configured to receive a portion of a hypercube to evaluate, wherein the portion of the hypercube comprises a plurality of cells, wherein a set of cells of the plurality of cells includes a formula, wherein a cell of the plurality of cells includes a formula or a number to evaluate, and a processor configured to determine one or more terms in the formula for each cell of the set of cells, remove from consideration a time dimension and/or a primary dimension for the one or more terms in the formula for each cell of the set of cells, determine a set of distinct terms using the one or more terms, determine whether a total number of terms in the set of cells is larger than a number of distinct terms in the set of distinct terms, and in response to determining that the total number of terms in the set of cells is larger than the number of distinct terms in the set of distinct terms, indicate to cache the set of distinct terms during evaluation of the portion of the hypercube.

Figure 2:
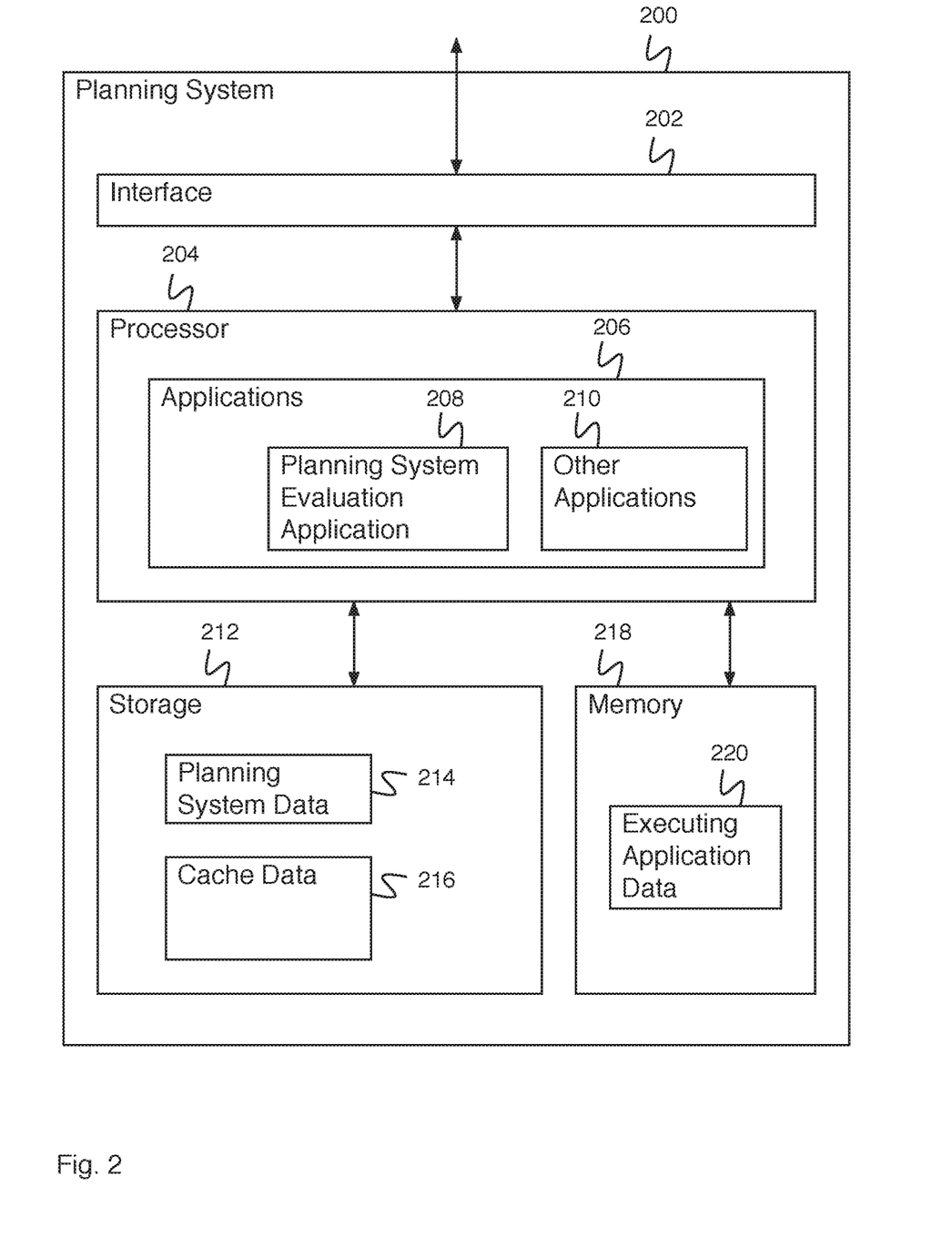
FIG. 2 is a block diagram illustrating an embodiment of a planning system.

FIG. 2 is a block diagram illustrating an embodiment of a planning system. In some embodiments, planning system 200 of FIG. 2 comprises planning system 106 of FIG. 1. In the example shown, planning system 200 comprises interface 202. Interface 202 comprises an interface for communicating with external systems using a network. For example, interface 202 comprises an interface for communicating with a user system (e.g., for receiving planning data, for receiving a formula definition, for receiving a request to evaluate a planning system, etc.). Processor 204 comprises a processor for executing applications 206. Applications 206 comprise planning system evaluation application 208 and other applications 210. For example, planning system evaluation application 208 receives a portion of a hypercube to evaluate, wherein the portion of the hypercube comprises a plurality of cells, wherein a set of cells of the plurality of cells includes a formula, wherein a cell of the plurality of cells includes a formula or a number to evaluate, determines one or more terms in the formula for each cell of the set of cells, removes from consideration a time dimension and/or a primary dimension for the one or more terms in the formula for each cell of the set of cells, determines a set of distinct terms using the one or more terms, determines whether a total number of terms in the set of cells is larger than a number of distinct terms in the set of distinct terms, and in response to determining that the total number of terms in the set of cells is larger than the number of distinct terms in the set of distinct terms, indicates to cache the set of distinct terms during evaluation of the portion of the hypercube. Other applications 210 comprises any other appropriate applications (e.g., a communications application, a chat application, a web browser application, a document preparation application, a data storage and retrieval application, a user interface application, a data analysis application, etc.). Planning system 200 additionally comprises storage 212. Storage 212 comprises planning system data 214 (e.g., comprising historical data, projected data, formula data, etc.) and cache data 216 (e.g., cached formula results or partial formula results). Tenant security control system 200 additionally comprises memory 218. Memory 218 comprises executing application data 220 comprising data associated with applications 206.

In some embodiments, all storage described herein is taking place in the main memory of the computer—for example, the planning system data that resides on disk in the database is loaded into the memory of the computer during execution. The decision to cache or not puts results in another part of memory that is easy to get to, and the results are available immediately, as opposed to the "compute path" in which data needs to be located (from locations in memory) and aggregated/combined together based on the logic of the formula.

Figure 3:
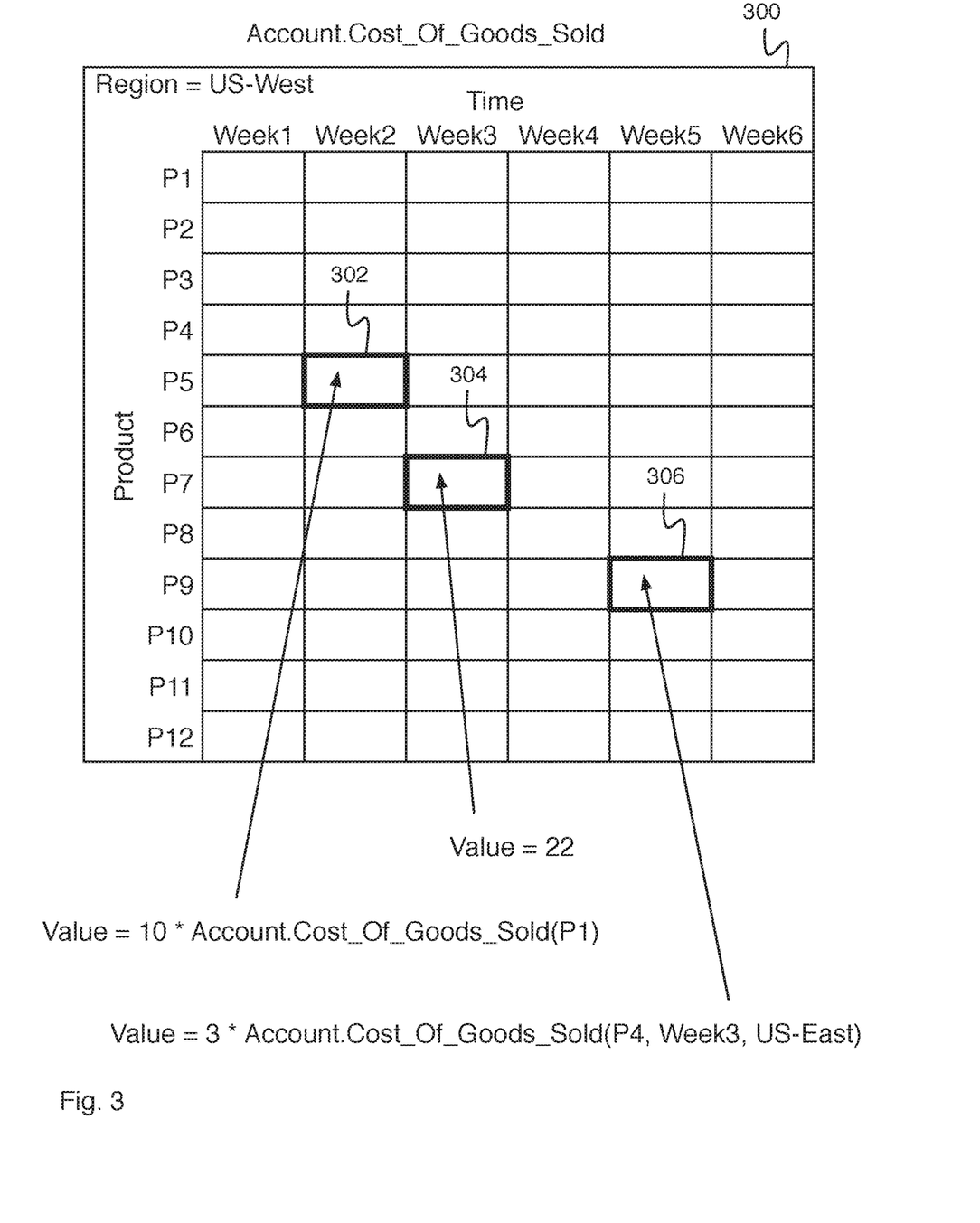
FIG. 3 is a diagram illustrating an embodiment of a portion of planning system data.

FIG. 3 is a diagram illustrating an embodiment of a portion of planning system data. In some embodiments, planning system data 300 is stored in planning system data 214 of FIG. 2. In the example shown, planning system data 300 comprises a plurality of cells. The location of each cell is associated with values of each of a set of dimensions. For example, cell 302 is associated with Product=P5 and Time=Week2. All cells shown in planning system data 300 are associated with Region=US-West and Account=Cost_Of_Goods_Sold. Other portions of planning system data that are not shown are associated with other values for Region or Account. For example, planning system data 300 comprises a portion of a hypercube.

Cells of planning system data 300 store either a formula or a number. For example, cell 304 comprises the number 22. Cell 306 comprises the formula Value=3*Account.Cost_Of_Goods_Sold(P4, Week3, US-East). The portion of the formula "Account.Cost_Of_Goods_Sold(P4, Week3, US-East)" comprises a reference to the value stored in the cell associated with Account=Cost_Of_Goods_Sold, Region=US-East, Product=P4, and Time=Week3. The reference comprises a term. Cell 302 comprises the formula Value=10*Account.Cost_Of_Goods_Sold(P1). The term of the formula of cell 302 indicates Account=Cost_Of_Goods_Sold and Product=P1, however, other dimensions are not indicated in the term. The other dimensions are inherited from the scope of the cell. For example, the term of the formula of cell 302 inherits Region=US-West and Time=Week2. For example, using inheritance, the same formula can have different values if it is stored in different locations.

Figure 4:
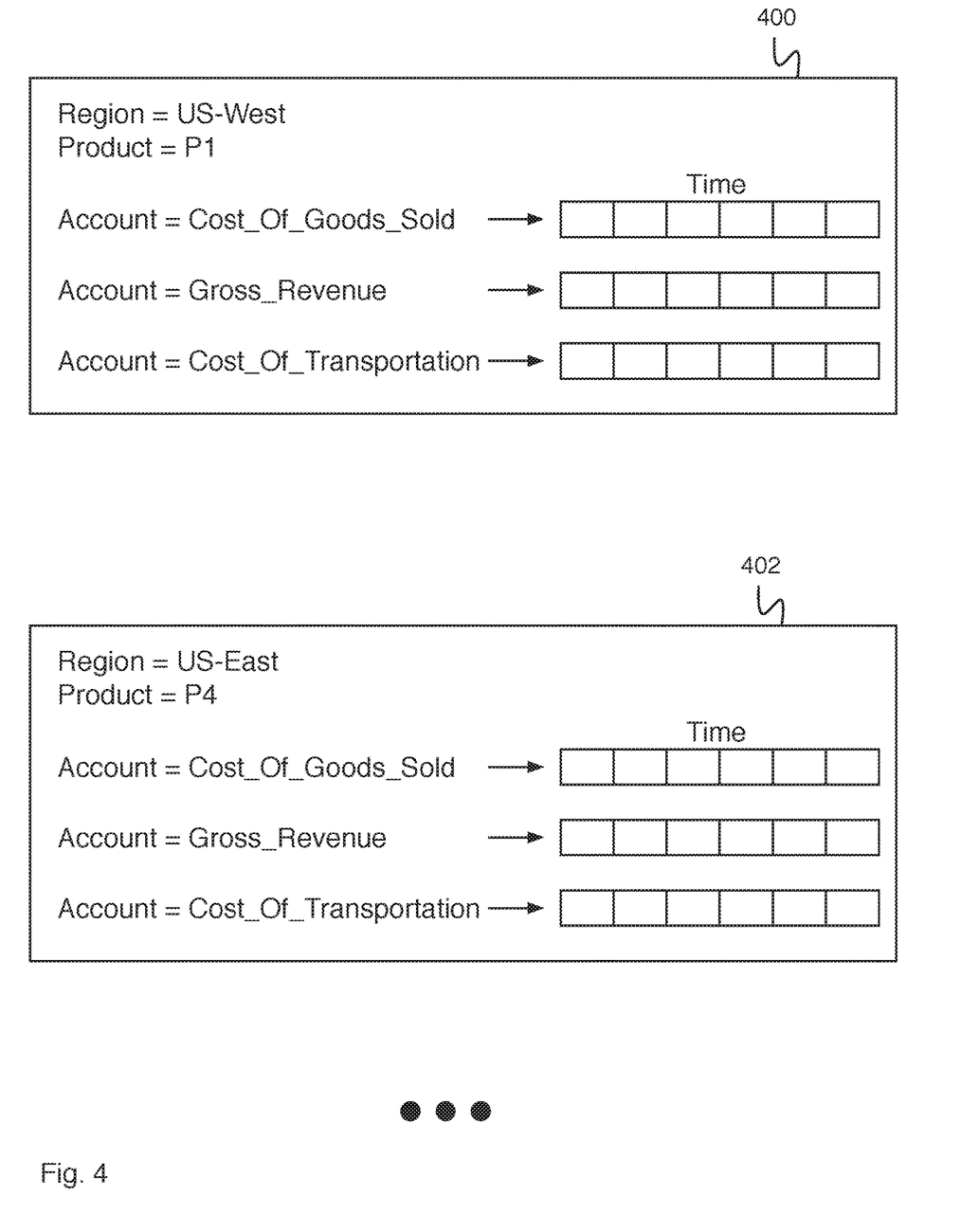
FIG. 4 is a diagram illustrating an embodiment of cache data.

FIG. 4 is a diagram illustrating an embodiment of cache data. In some embodiments, the cache data of FIG. 4 is stored in cache data 216 of FIG. 2. In the example shown, the cache data (e.g., cache data 400 and cache data 402) is a representative portion of all cache data of the system. Cache data 400 comprises data associated with Region=US-West and Product=P1. Cache data 402 comprises an analogous data structure associated with Region=US-East and Product=P4. For each value that can be associated with the primary dimension Account (e.g., Cost_Of_Goods_Sold, Gross_Revenue, or Cost_Of_Transportation), a vector of cell values associated with time values is stored for cache data 400 and cache data 402. In some embodiments, for counting the number of data objects stored in the cache, the number of time vectors is counted for each cache data set and summed together.

Figure 5:
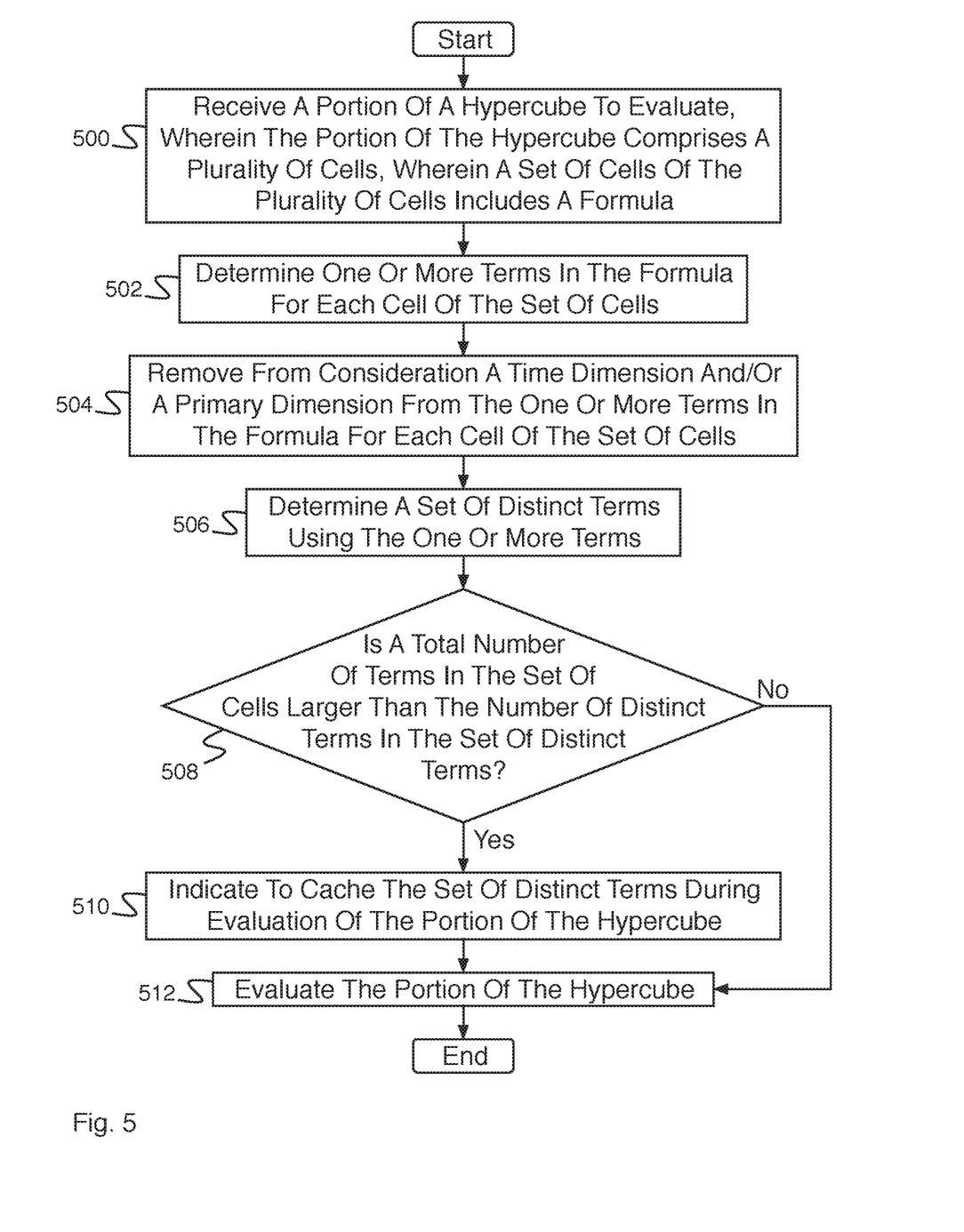
FIG. 5 is a flow diagram illustrating an embodiment of a process for caching.

FIG. 5 is a flow diagram illustrating an embodiment of a process for caching. In some embodiments, the process for caching of FIG. 5 is executed by planning system 106 of FIG. 1. In the example shown, in 500, a portion of a hypercube is received to evaluate, wherein the portion of the hypercube comprises a plurality of cells, wherein a set of cells of the plurality of cells includes a formula. For example, a hypercube of data, which includes cells with many associated dimensions (e.g., a primary dimension, a time dimension, etc.), can have a formula or a number that can be evaluated to provide a value for the cell. In some embodiments, cells with formulas are identified as a set of cells with formulas in their cells. In some embodiments, cells with numbers are identified as a group of cells with numbers in their cells. In 502, one or more terms in the formula for each cell of the set of cells is determined. For example, a term comprises a reference to another cell value, specified by indicated dimension values and/or inherited dimension values. In 504, a time dimension and/or a primary dimension are removed from consideration for the one or more terms in the formula for each cell of the set of cells. For example, the primary dimension (e.g., an account) and/or a time dimension is removed from being considered for the number of times that the formula is needed to be evaluated for the cell. For the hypercube, the time dimension is an implicitly present dimension as the values for the hypercube are created for each time using the same formulas (e.g., for each day, week, month, quarter, year, etc.). In 506, a set of distinct terms is determined using the one or more terms. In 508, it is determined whether a total number of terms in the set of cells is larger than the number of distinct terms in the set of distinct terms. For example, determining the total number of terms in the set of cells comprises counting the number of terms in the set of cells, and determining the number of distinct terms in the set of distinct terms comprises counting the number of distinct terms in the set of distinct terms. In some embodiments, determining the number of distinct terms in the set of distinct terms comprises multiplying the result of counting the set of distinct terms by the cardinality (e.g., number of possible values) of the primary dimension. For example, terms are typically evaluated for all possible values of the primary dimension across the hypercube. Removing the primary dimension from the count of distinct terms and then multiplying the final count by the cardinality of the primary dimension comprises a performance optimization.

In some embodiments, determining whether a total number of terms in the set of cells is larger than the number of distinct terms in the set of distinct terms comprises determining whether a total number of terms in the set of cells is greater than a threshold factor (e.g., 2 times, 5 times, 10 times, etc.) larger than the number of distinct terms in the set of distinct terms. In the event it is determined that a total number of terms in the set of cells is not larger than the number of distinct terms in the set of distinct terms, control passes to 512. In the event it is determined that a total number of terms in the set of cells is larger than the number of distinct terms in the set of distinct terms, control passes to 510. In 510, the process indicates to cache the set of distinct terms during evaluation of the portion of the hypercube. In 512, the portion of the hypercube is evaluated.

Figure 6:
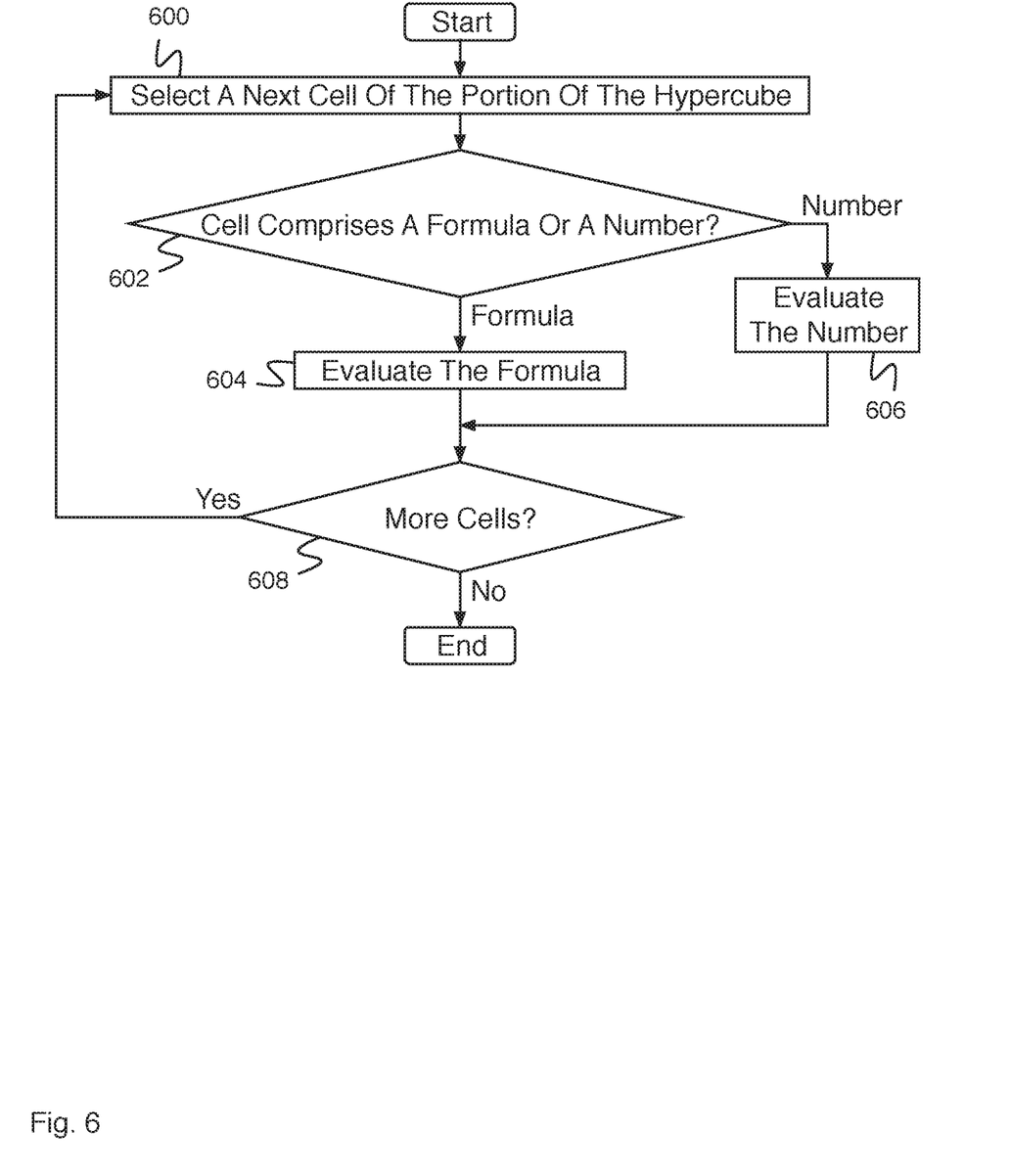
FIG. 6 is a flow diagram illustrating an embodiment of a process for evaluating a portion of a hypercube.

FIG. 6 is a flow diagram illustrating an embodiment of a process for evaluating a portion of a hypercube. In some embodiments, the process of FIG. 6 implements 512 of FIG. 5. In the example shown, in 600, a next cell of the portion of the hypercube is selected. In some embodiments, the next cell comprises the first cell. In 602, it is determined whether the cell comprises a formula or a number. In the event it is determined that the cell comprises a number, control passes to 606. In 606, the number is evaluated (e.g., its value is returned), and control passes to 608. In the event it is determined in 602 that the cell comprises a formula, control passes to 604. In 604, the formula is evaluated. For example, evaluating the formula comprises determining values referenced by terms of the formula and combining them according to the formula description. In 608, it is determined whether there are more cells. For example, it is determined whether there are more cells to evaluate in the portion of the hypercube. In the event it is determined that there are more cells, control passes to 600. In the event it is determined that there are not more cells, the process ends.

Figure 7:
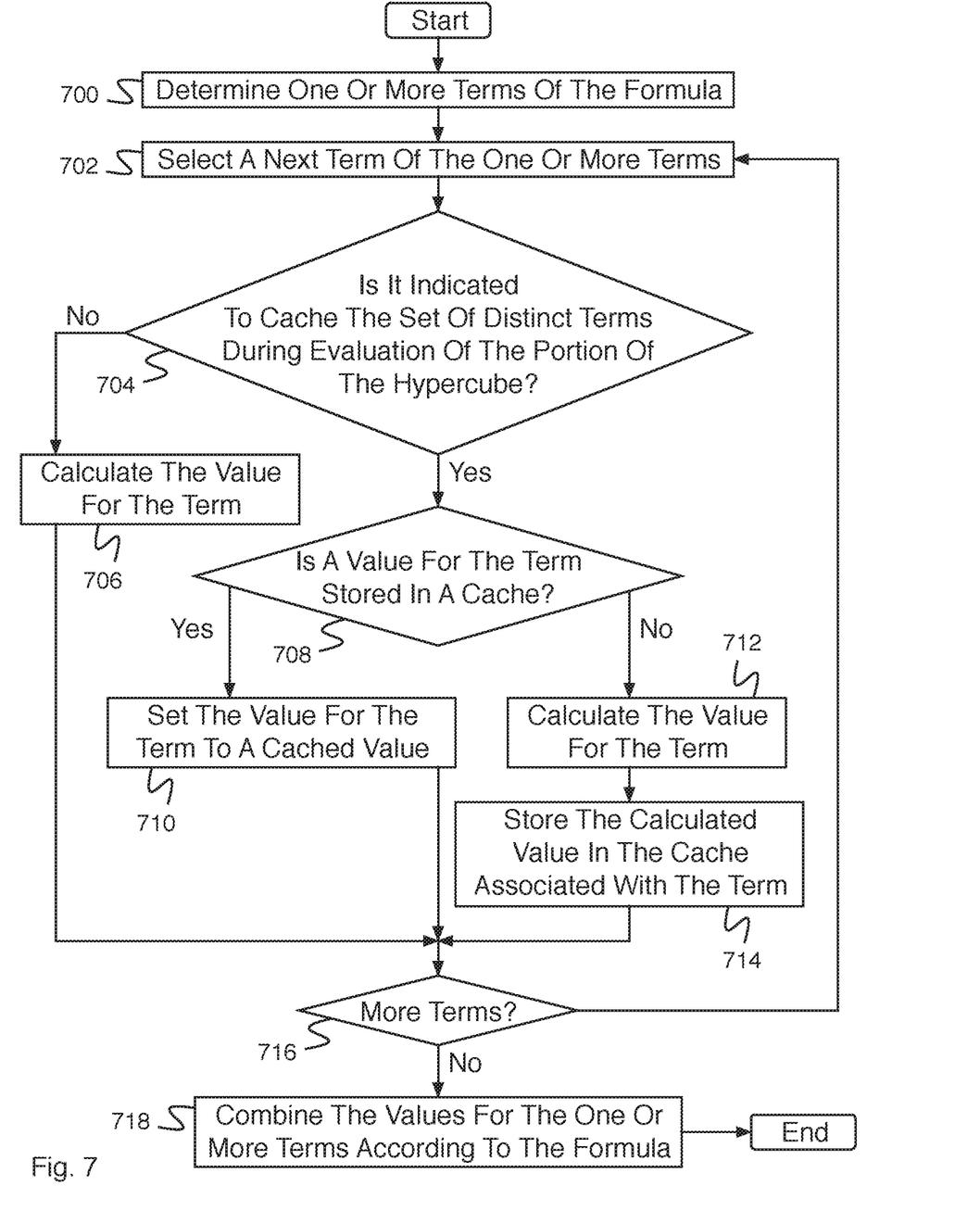
FIG. 7 is a flow diagram illustrating an embodiment of a process for evaluating a formula.

FIG. 7 is a flow diagram illustrating an embodiment of a process for evaluating a formula. In some embodiments, the process of FIG. 7 implements 604 of FIG. 6. In the example shown, in 700, one or more terms of the formula are determined. In 702, a next term of the one or more terms is selected. In some embodiments, the next term comprises the first term. In 704, it is determined whether it is indicated to cache the set of distinct terms during evaluation of the portion of the hypercube. In the event it is not indicated to cache the set of distinct terms during evaluation of the portion of the hypercube, control passes to 706. In 706, a value for the term is calculated. For example, calculating a value for the term comprises accessing a stored value at a location in the hypercube indicated by the term or evaluating a formula at a location in the hypercube indicated by the term. Control then passes to 716. In the event it is determined in 704 that it is indicated to cache the set of distinct terms during evaluation of the portion of the hypercube, control passes to 708. In 708, it is determined whether a value for the term is stored in a cache. For example, the term is looked up in an index of cached terms. In some embodiments, the term is looked up in the index by a key based on a description of the term (e.g., text description, hash of text, etc.). In the event it is determined that a value for the term is stored in a cache, control passes to 710. In 710, a value for the term is set to a cached value, and control passes to 716. For example, the index is used to look up the value of the term as stored in the cache. In the event it is determined in 708 that a value for the term is not stored in a cache, control passes to 712. In 712, the value for the term is calculated. For example, calculating a value for the term comprises accessing a stored value at a location in the hypercube indicated by the term or evaluating a formula at a location in the hypercube indicated by the term. In 714, the calculated value is stored in the cache associated with the term, and control passes to 716. For example, the term value is stored and indexed in a cache index associated with the term. In 716, it is determined whether there are more terms (e.g., more terms of the formula). In the event it is determined that there are more terms, control passes to 702. In the event it is determined that there are not more terms, control passes to 718. In 718, the values for the one or more terms are combined according to the formula.

Figure 8:
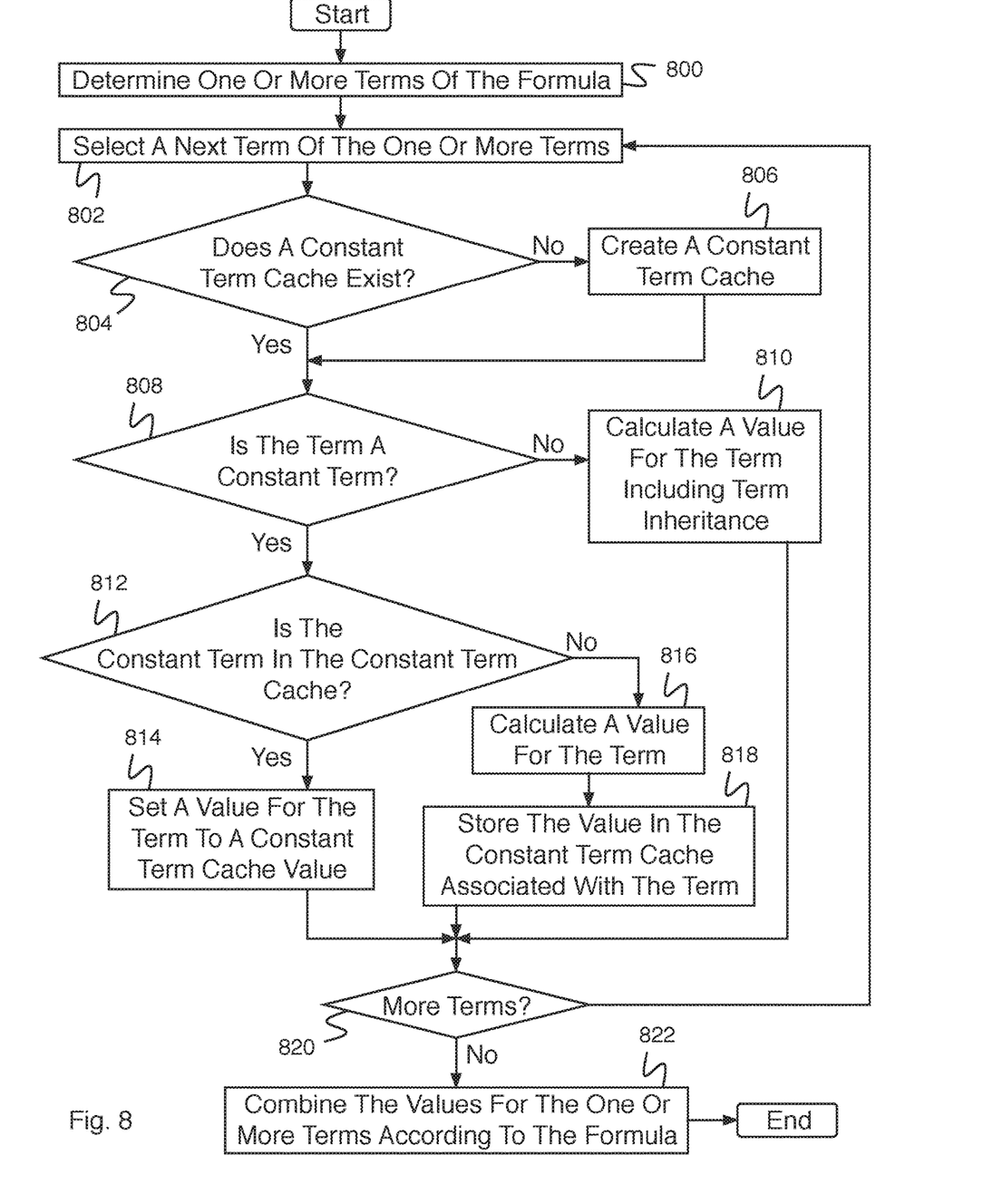
FIG. 8 is a flow diagram illustrating an embodiment of a process for evaluating a formula.

FIG. 8 is a flow diagram illustrating an embodiment of a process for evaluating a formula. In some embodiments, the process of FIG. 8 implements 604 of FIG. 6. In the example shown, in 800, one or more terms of the formula are determined. In 802, a next term of the one or more terms is selected. In some embodiments, the next term comprises the first term. In 804, it is determined whether a constant term cache exists. In the event it is determined that the constant term cache does not exist, control passes to 806. In 806, a constant term cache is created. Control then passes to 808. In the event it is determined in 804 that a constant term cache exists, control passes to 808. In 808, it is determined whether the term is a constant term. For example, determining whether the term is a constant term comprises determining whether all dimensions required to determine the value of the term are specified in the formula definition (e.g., no dimensions are left unspecified in the formula definition and inherited from the scope of the cell). In the event it is determined that the term is not a constant term, control passes to 810. In 810, a value for the term is calculated including term inheritance, and control passes to 820. For example, values for dimensions left unspecified in the formula definition are inherited from the scope of the cell, and a stored value at a location in the hypercube indicated by the term is accessed or a formula at a location in the hypercube indicated by the term is evaluated. In the event it is determined in 808 that the term is a constant term, control passes to 812. In 812, it is determined whether the constant term is in the constant term cache. In the event it is determined that the constant term is in the constant term cache, control passes to 814. In 814, a value for the term is set to a constant term cache value, and control then passes to 820. For example, the term is looked up in a constant term index to determine whether the value is stored in the constant term cache. In the event it is determined in 812 that the constant term is not in the constant term cache, control passes to 816. In 816, a value is calculated for the term, and control passes to 818. For example, calculating a value for the term comprises accessing a stored value at a location in the hypercube indicated by the term or evaluating a formula at a location in the hypercube indicated by the term. In 818, the value is stored in the constant term cache associated with the term. For example, the value is stored in the constant term cache associated with the term using a constant term index, wherein the index uses a key based on the text description of the constant term or a hash of the text of the constant term. In 820, it is determined whether there are more terms (e.g., more terms in the one or more terms of the formula). In the event it is determined that there are more terms, control passes to 802. In the event it is determined that there are not more terms, control passes to 822. In 822, the values for the one or more terms are combined according to the formula.

Figure 9:
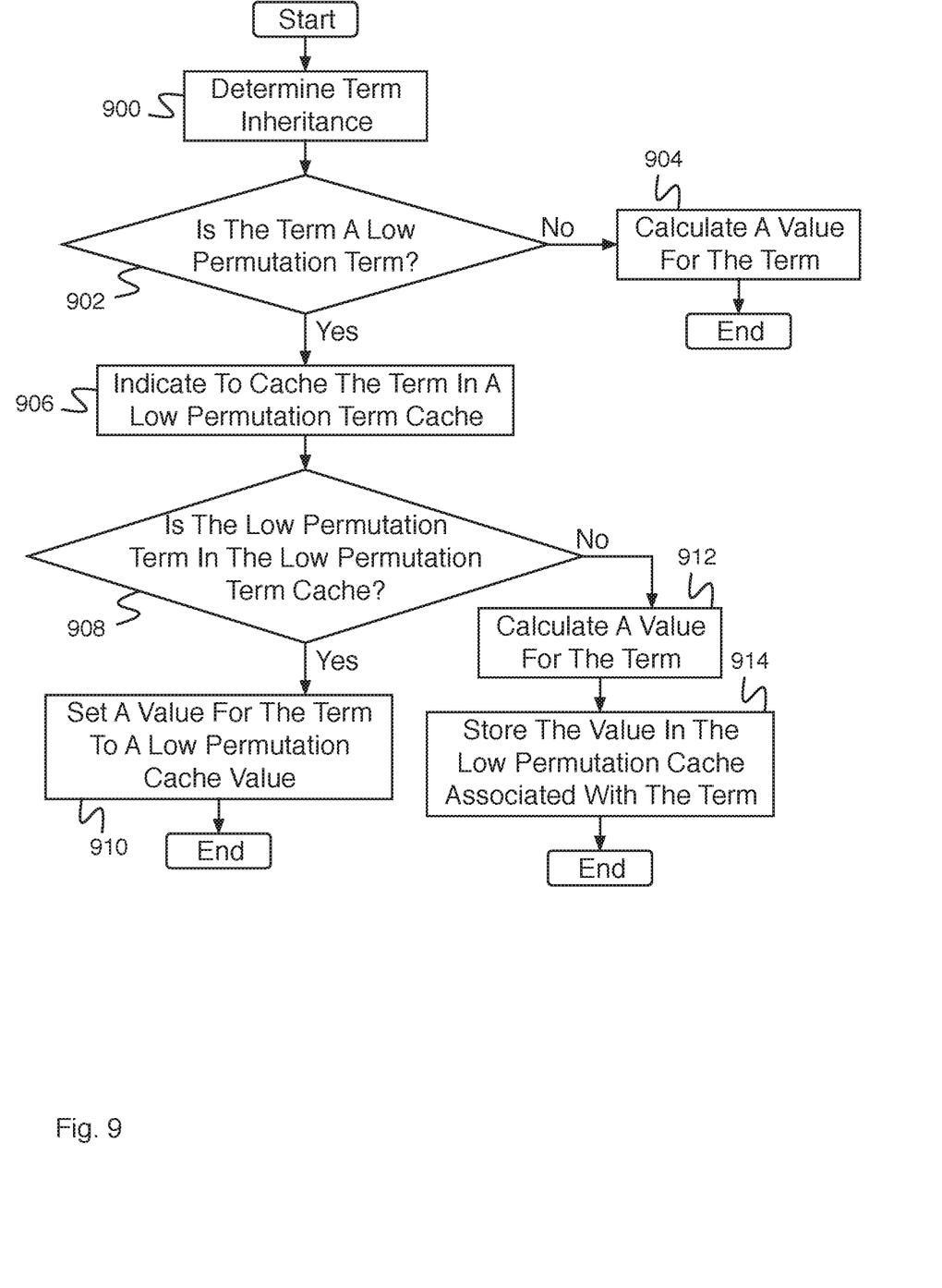
FIG. 9 is a flow diagram illustrating an embodiment of a process for calculating a value for a term including term inheritance.

FIG. 9 is a flow diagram illustrating an embodiment of a process for calculating a value for a term including term inheritance. In some embodiments, the process of FIG. 9 implements 810 of FIG. 8. In the example shown, in 900, term inheritance is determined. For example, determining term inheritance comprises determining one or more inherited dimension values using scoping. In 902, it is determined whether the term is a low permutation term. For example, a low permutation term comprises a term that has fewer possible term inheritance combinations than the number of times it appears (e.g., a term with one inherited dimension with four possible values that appears in the hypercube 100 times). In some embodiments, determination of which terms are low permutation terms is determined prior to evaluation of the hypercube. In the event it is determined that the term is not a low permutation term, control passes to 904. In 904, a value is calculated for the term, and the process ends. For example, calculating a value for the term comprises accessing a stored value at a location in the hypercube indicated by the term or evaluating a formula at a location in the hypercube indicated by the term. In the event it is determined in 902 that the term comprises a low permutation term, control passes to 906. In 906, the process indicates to cache the term in a low permutation term cache. In 906, it is determined whether the low permutation term is in the low permutation term cache. In the event it is determined that the low permutation term is in the low permutation term cache, control passes to 910. In 910, a value for the term is set to a low permutation cache value, and the process then ends. In the event it is determined in 908 that the low permutation term is not in the low permutation term cache, control passes to 912. In 912, a value is calculated for the term. For example, calculating a value for the term comprises accessing a stored value at a location in the hypercube indicated by the term or evaluating a formula at a location in the hypercube indicated by the term. In 914, the value is stored in the low permutation cache associated with the term. For example, the value calculated is stored in the low permutation cache, and the value is indexed associated with the term (e.g., the text description of the term or a hash of the text description of the term).

Figure 10:
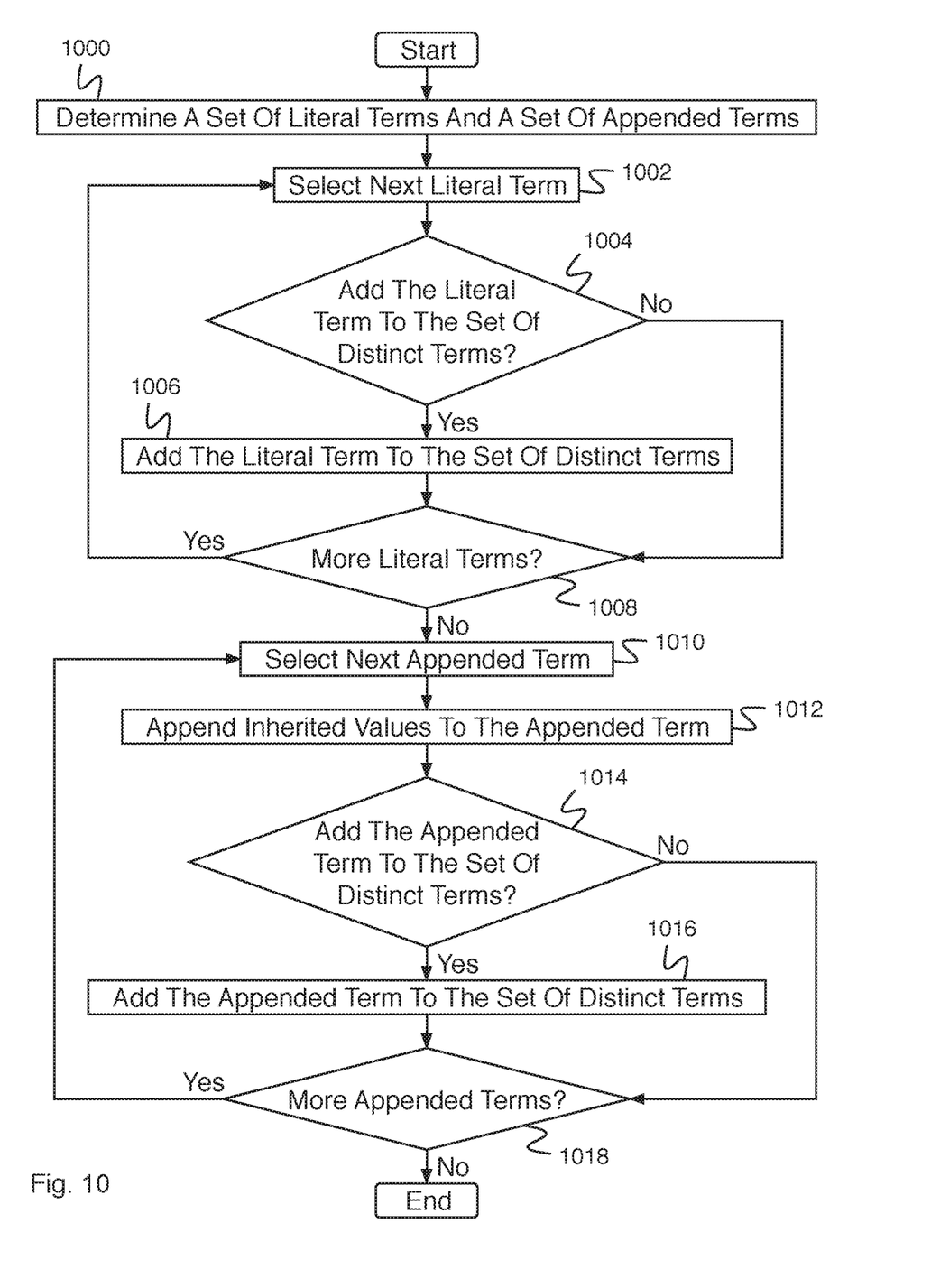
FIG. 10 is a flow diagram illustrating an embodiment of a process for determining a set of distinct terms using one or more terms.

FIG. 10 is a flow diagram illustrating an embodiment of a process for determining a set of distinct terms using one or more terms. In some embodiments, the process of FIG. 10 implements 506 of FIG. 5. In the example shown, in 1000, a set of literal terms and a set of appended terms are determined. For example, a set of literal terms comprises a set of terms wherein all dimensions are literally specified for each term, and a set of appended terms comprises a set of terms wherein some dimensions are not literally specified and must be determined using inheritance and appended to the term. In 1002, the next literal term is selected. In some embodiments, the next literal term comprises the first literal term. In 1004, it is determined whether to add the literal term to the set of distinct terms. For example, it is determined to add the literal term to the set of distinct terms in the event that the literal term is not already in the set of distinct terms. In the event it is determined not to add the literal term to the set of distinct terms, control passes to 1008. In the event it is determined to add the literal term to the set of distinct terms, control passes to 1006. In 1006, the literal term is added to the set of distinct terms, and control passes to 1008. In 1008, it is determined whether there are more literal terms (e.g., more literal terms in the set of literal terms). In the event it is determined that there are more literal terms, control passes to 1002. In the event it is determined that there are not more literal terms, control passes to 1010. In 1010, a next appended term is selected. In some embodiments, the next appended term comprises the first appended term. In 1012, inherited values are appended to the appended term. For example, inherited values are determined from a cell location associated with the appended term and appended to the appended term. In 1014, it is determined whether to add the appended term to the set of distinct terms. For example, it is determined to add the appended term to the set of distinct terms in the event that the appended term is not already in the set of distinct terms. In the event it is determined not to add the appended term to the set of distinct terms, control passes to 1018. In the event it is determined to add the appended term to the set of distinct terms, control passes to 1016. In 1016, the appended term is added to the set of distinct terms. In 1018, it is determined whether there are more appended terms. In the event it is determined that there are more appended terms, control passes to 1010. In the event it is determined that there are not more appended terms, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for caching, comprising:
   an interface configured to:
   receive a portion of a hypercube to evaluate, wherein the portion of the hypercube comprises a plurality of cells; and
   a processor configured to:
   determine a total number of terms in the plurality of cells, wherein each term in the total number of terms comprises a reference to a value in another cell of the hypercube;
   remove from consideration a time dimension and/or an account for each term in the total number of terms;
   determine a set of distinct terms in the total number of terms;
   determine whether the total number of terms in the set of cells is greater than a threshold factor larger than a number of distinct terms in the set of distinct terms; and
   in response to determining that the total number of terms in the set of cells is greater than the threshold factor larger than the number of distinct terms in the set of distinct terms:
   indicate to cache the set of distinct terms during evaluation of the portion of the hypercube;
   in response to a determination that a stored value for a term of the one or more terms is stored in a cache, set a value for the term to the stored value; and
   in response to a determination that a stored value for the term is not stored in the cache:
   calculate a calculated value for the term;
   set the value for the term to the calculated value; and
   store the calculated value in the cache as the stored value for the term.

2. The system as in claim 1, wherein determining the set of distinct terms includes determining whether to add a literal term to the set of distinct terms.

3. The system as in claim 2, wherein the processor is further configured to:
   in response to determining to add the literal term to the set of distinct terms:
   add the literal term to the set of terms.

4. The system as in claim 1, wherein determining the set of distinct terms includes appending inherited values to an associated term to generate an appended term and determining whether to add the appended term to the set of distinct terms.

5. The system as in claim 4, wherein the processor is further configured to:
   in response to determining to add the appended term to the set of terms:
   add the appended term to the set of terms.

6. The system as in claim 1, wherein determining the number of distinct terms in the set of distinct terms comprises counting the set of distinct terms.

7. The system as in claim 6, wherein determining the number of distinct terms comprises multiplying the result of counting the set of distinct terms by the cardinality of the primary dimension.

8. The system as in claim 1, wherein determining the total number of terms in the plurality of cells comprises counting the number of terms in the set of cells.

9. The system as in claim 1, wherein the processor is further configured to evaluate a cell in the portion of the hypercube, wherein evaluating the cell comprises evaluating a formula or a number.

10. The system as in claim 9, wherein evaluating the formula comprises evaluating one or more terms in the formula.

11. The system as in claim 10, wherein evaluating the one or more terms comprises determining whether it is indicated to cache the set of distinct terms during evaluation of the portion of the hypercube.

12. The system as in claim 1, wherein the processor is further configured to determine whether a constant term cache exists.

13. The system as in claim 12, wherein the processor is further configured to in response to the constant term cache existing, determine whether a term is a constant term.

14. The system as in claim 13, wherein the processor is further configured to in response to determining the term is the constant term, determine whether the term is in the constant term cache.

15. The system as in claim 14, wherein the processor is further configured to in response to determining that the term is in the constant term cache, set the value for the term to a constant term cache value associated with the term.

16. The system as in claim 14, wherein the processor is further configured to in response to determining that the term is not in the constant term cache, calculate the value for the term and store the value for the term in the constant term cache associated with the term.

17. The system as in claim 1, wherein the processor is further configured to determine whether a term comprises a low permutation term, and in response to determining that the term comprises the low permutation term, indicate to cache the low permutation term in a low permutation term cache.

18. The system as in claim 17, wherein in response to the low permutation term being in the low permutation term cache, set a term value for the low permutation term to a stored value in the low permutation cache.

19. The system as in claim 17, wherein in response to the low permutation term not being in the low permutation term cache, calculate a calculated term value for the low permutation term and store the calculated term value for the low permutation term in the low permutation cache.

20. The system as in claim 1, wherein the processor is further configured to in response to determining that the number of distinct terms in the set of distinct terms is not greater than the threshold factor larger than the total number of terms in the set of cells:
   indicate to not cache the set of distinct terms during evaluation of the portion of the hypercube;
   calculate the calculated value for the term; and
   set the value for the term to the calculated value.

21. A method for caching, comprising:
   receiving a portion hypercube to evaluate, wherein the portion of the hypercube comprises a plurality of cells;
   determining, using a processor, a total number of terms in the plurality of cells, wherein each term in the total number of terms comprises a reference to a value in another cell of the hypercube;
   removing from consideration a time dimension and/or an account for each term in the total number of terms;
   determining a set of distinct terms in the total number of terms;
   determining whether the total number of terms in the set of cells is greater than a threshold factor larger than a number of distinct terms in the set of distinct terms; and
   in response to determining that the total number of terms in the set of cells is greater than the threshold factor larger than the number of distinct terms in the set of distinct terms:
      indicating to cache the set of distinct terms during evaluation of the portion of the hypercube;
      in response to a determination that a stored value for a term of the one or more terms is stored in a cache, setting a value for the term to the stored value; and
      in response to a determination that a stored value for the term is not stored in the cache:
         calculating a calculated value for the term;
         setting the value for the term to the calculated value; and
         storing the calculated value in the cache as the stored value for the term.

22. A computer program product for caching, the computer program product being embodied in a non-transitory computer readable storage medium and comprising computer instructions for:
   receiving a portion hypercube to evaluate, wherein the portion of the hypercube comprises a plurality of cells;
   determining, using a processor, a total number of terms in the plurality of cells, wherein each term in the total number of terms comprises a reference to a value in another cell of the hypercube;
   removing from consideration a time dimension and/or an account for each term in the total number of terms;
   determining a set of distinct terms in the total number of terms;
   determining whether the total number of terms in the set of cells is greater than a threshold factor larger than a number of distinct terms in the set of distinct terms; and
   in response to determining that the total number of terms in the set of cells is greater than the threshold factor larger than the number of distinct terms in the set of distinct terms:
      indicating to cache the set of distinct terms during evaluation of the portion of the hypercube;
      in response to a determination that a stored value for a term of the one or more terms is stored in a cache, setting a value for the term to the stored value; and
      in response to a determination that a stored value for the term is not stored in the cache:
         calculating a calculated value for the term;
         setting the value for the term to the calculated value; and
         storing the calculated value in the cache as the stored value for the term.

* * * * *